(12) United States Patent
Cannon et al.

(10) Patent No.: US 7,174,007 B1
(45) Date of Patent: Feb. 6, 2007

(54) METHOD AND APPARATUS PROVIDING CALLER IDENTIFICATION TELEPHONE SERVICE WITH A REAL TIME AUDIO MESSAGE

(75) Inventors: Joseph M. Cannon, Harleysville, PA (US); Lakshmi Narayana Jampanaboyana, Allentown, PA (US); James A. Johanson, Macungie, PA (US); Philip David Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/553,125

(22) Filed: Apr. 19, 2000

(51) Int. Cl.
*H04M 1/64* (2006.01)

(52) U.S. Cl. ............... 379/88.21; 379/127.01; 379/142.04; 379/374.02; 455/563

(58) Field of Classification Search ............. 379/88.02, 379/88.01, 88.03, 67.1, 88, 88.19, 142.01, 379/142.04, 142.17, 373.02, 82, 88.07, 88.2, 379/88.21; 455/563
See application file for complete search history.

(56) References Cited

U.S. PATENT DOCUMENTS

| | | | | |
|---|---|---|---|---|
| 4,551,581 A | * | 11/1985 | Doughty | 379/142.01 |
| 5,444,767 A | * | 8/1995 | Goetcheus et al. | 379/67.1 |
| 5,631,950 A | * | 5/1997 | Brown | 379/67.1 |
| 5,646,979 A | * | 7/1997 | Knuth | 455/563 |
| 5,850,435 A | * | 12/1998 | Devillier | 379/88.19 |
| 5,867,567 A | * | 2/1999 | Itoh | 379/142.04 |
| 5,905,786 A | * | 5/1999 | Hoopes | 379/142.12 |
| 6,044,148 A | * | 3/2000 | Bleile | 379/373.02 |
| 6,178,232 B1 | * | 1/2001 | Latter et al. | 379/88.21 |
| 6,347,136 B1 | * | 2/2002 | Horan | 379/142.01 |
| 6,353,664 B1 | * | 3/2002 | Cannon et al. | 379/142.1 |
| 6,373,925 B1 | * | 4/2002 | Guercio et al. | 379/82 |
| 6,466,653 B1 | * | 10/2002 | Hamrick et al. | 379/67.1 |
| 6,618,474 B1 | * | 9/2003 | Reese | 379/142.17 |
| 6,870,914 B1 | * | 3/2005 | Bossemeyer et al. | 379/142.06 |
| 2002/0090064 A1 | * | 7/2002 | Burg | 379/67.1 |

* cited by examiner

*Primary Examiner*—Gerald Gauthier

(57) ABSTRACT

An Audio Caller ID service is provided which permits the calling party to speak a real time audio message that can be received and played by the called party's Caller ID equipment while his telephone equipment remains in the "on-hook" state. A calling party which has Audio Caller ID (ACID) service would speak a short audio message before dialing the called party. That message is converted to digital form, optionally compressed, and transferred to the called party in a manner similar to conventional Caller ID information. The called party's Caller ID equipment operates in the conventional manner, except that the received Audio Caller ID signal is recognized as an audio signal. At the site of the called party, a decoder is provided to convert the digital signal to an analog audio signal, and this analog signal is provided to a speaker, which plays back the calling party's audio message.

12 Claims, 4 Drawing Sheets

Fig. 2
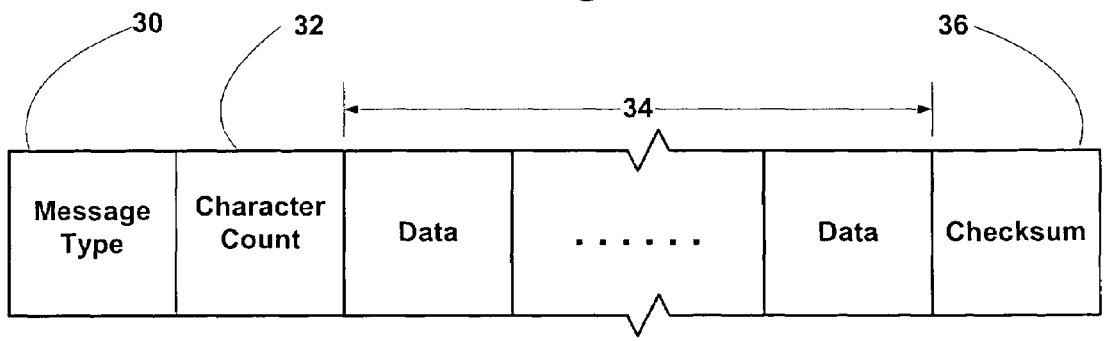
MESSAGE FORMAT
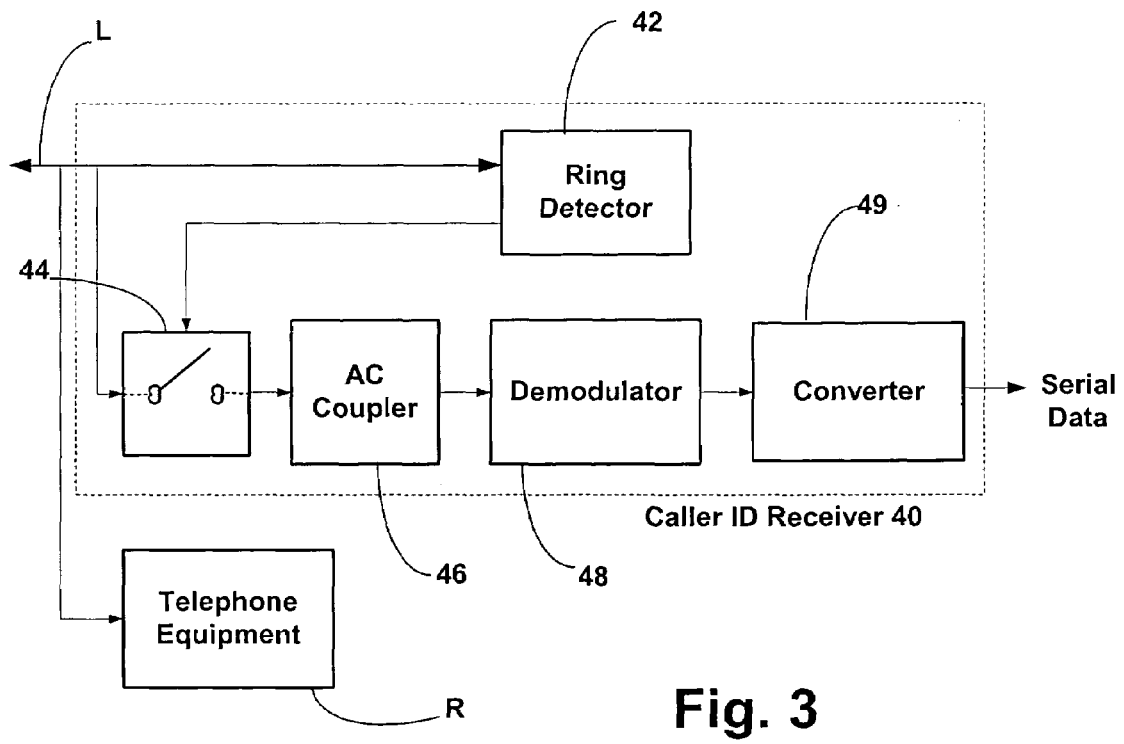
Fig. 3

METHOD AND APPARATUS PROVIDING CALLER IDENTIFICATION TELEPHONE SERVICE WITH A REAL TIME AUDIO MESSAGE

FIELD OF THE INVENTION

The present invention relates generally to a method and apparatus for providing caller identification in telephone systems and, more particularly, concerns providing a real time audio message in a telephone system before a connection is established between a calling party and a called party.

BACKGROUND OF THE INVENTION

Today, calling party identification (Caller ID) service is widely available in most industrialized countries. A fundamental method and apparatus for providing Caller ID service in a telephone communication system are disclosed in U.S. Pat. No. 4,551,581 granted Nov. 5, 1985 to C. A. Doughty, and a fundamental method and apparatus for receiving Caller ID information at a telephone receiver are disclosed in U.S. Pat. No. 4,582,956 granted to C. A. Doughty on Apr. 15, 1986. The disclosures of these patents are incorporated herein by reference.

Conventional Caller ID equipment provides an identification of the calling party to the called party's telephone customer premises equipment before a telephone connection is established. That is, the Caller ID information is provided to the called party while his telephone equipment remains in an "on-hook" state. Specifically, the central office alerts a called party to an incoming message by ringing his telephone equipment. A ringing signal is applied to the telephone equipment intermittently, with a silent interval being provided between consecutive rings of telephone equipment. When the called party lifts the telephone receiver, the telephone equipment assumes an "off-hook" state, but prior to that time, it remains in an "on-hook" state. Generally, caller ID information is transmitted to the called party's telephone equipment during the "on-hook" state in the silent interval between the first and second rings, but it may come prior to the first ring, after which the Caller ID information is displayed to the called party.

A shortcoming of conventional Caller ID service is that it does not identify the actual calling party, but only the telephone equipment from which the call is being made. When a party is identified, it is registered owner of the telephone equipment from which the call is being made. Thus, when the calling party calls from telephone equipment which is shared among many individuals, from a telephone at a site he is only visiting, from a pay telephone, or through a PBX, the called party cannot identify the actual calling party without going "off-hook" on this telephone equipment and speaking to the calling party. This, however, defeats the intended purpose of Caller ID service.

In accordance with the present invention, a Caller ID service is provided which permits the calling party to speak a real time audio message that can be received and played by the called party's Caller ID equipment while his telephone equipment remains in the "on-hook" state. A calling party which has Audio Caller ID (ACID) service would speaker a short audio message before dialing the called party. That message is converted to digital form, optionally compressed, and transferred to the called party in a manner similar to conventional Caller ID information. The called party's Caller ID equipment operates in the conventional manner, except that the received Audio Caller ID signal is recognized as an audio signal. At the site of the called party, a decoder is provided to convert the digital signal to an analog audio signal, and this analog signal is provided to a speaker, which plays back the calling party's audio message.

Preferably, conventional Caller ID operation is preserved when Audio Caller ID service is provided. This is achieved by sending the Audio Caller ID data in the silent interval following the second ring. The audio Caller ID equipment treats any signal received after the first ring as a conventional caller ID signal and any signal received after the second ring as an Audio Caller ID signal. An Audio Caller ID receiver could then store conventional Caller ID information in the conventional manner (i.e. allowing the called party to view information about a predetermined number of received calls), while also permitting an audio message or clip to be stored in association with each call. The Audio caller ID may also be sent during rings or regardless of rings.

BRIEF DESCRIPTION OF THE DRAWINGS

The foregoing brief description, as well as other features and advantages of the present invention, will be understood more completely from the following detailed description of a presently preferred, but nonetheless illustrative, embodiment, with reference being had to the accompanying drawings, in which:

FIG. 2 illustrates the message format in a conventional Caller ID system;

FIG. 3 is a functional block diagram illustrating the structure of a conventional Caller ID receiver;

DETAILED DESCRIPTION OF THE PREFERRED EMBODIMENT

Figure 1:
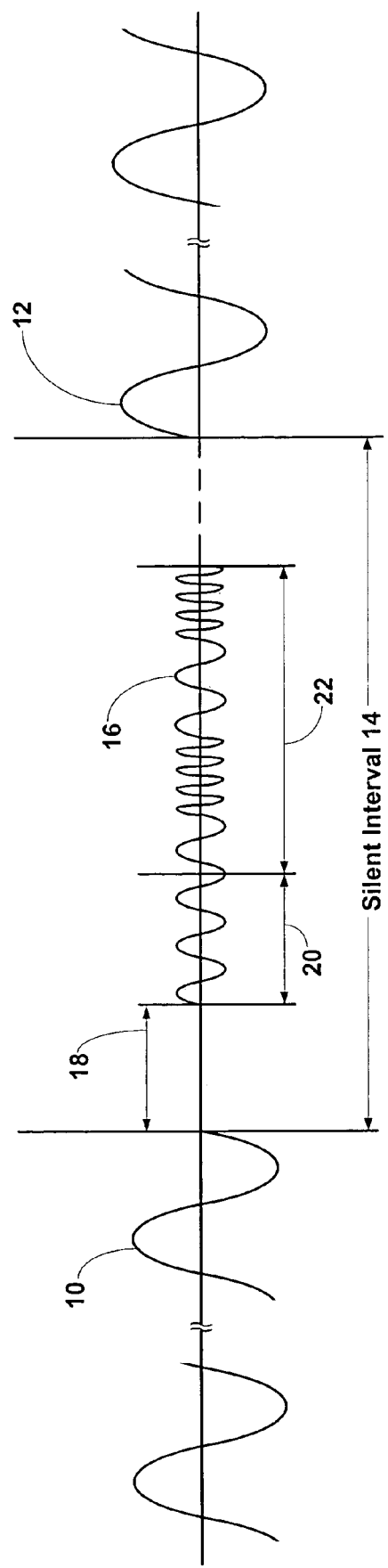
FIG. 1 is a waveform diagram representing the operating signals in a conventional Caller ID system.

Turning now to FIG. 1, there is illustrated a waveform representing the operating signals in a conventional Caller ID system, all signals being plotted against time. These are the signals typically produced at the central office and presented to the called party's telephone customer premises equipment. Signals 10 and 12 represent the first and second ring signals, which are separated by a first silent interval 14. Each ringing signal is typically a 20Hz, 86 volt RMS site wave superimposed on −48 volts and is produced at the central office on the ring lead to indicate to a customer's called telephone equipment that a telephone call is being received. Each ringing signal has a duration of approximately two seconds, and the silent interval is approximately four seconds. Although not shown in FIG. 1, it will be understood that in the conventional telephone system ringing signal 12 is followed by a second silent interval, a third ringing signal, a third silent interval, etc. These ringing signals and silent intervals continue until the called party's telephone equipment goes off-hook.

In a conventional Caller ID system, Caller ID information is introduced in the first silent interval 14. The Caller ID information is in the form of a frequency shift keyed (FSK) signal received a short interval 18 after the termination of the ringing signal. Interval 18 typically has a 300–350 millisecond duration. The FSK signal 16 contains two carrier frequencies, such as 2100 and 2200 Hz, which represent the low or "0" and higher "1" logic levels, respectively, of a serial data message. During an interval 20, a continuous frequency signal, such as 2100 Hz is transmitted, to permit the Caller ID equipment and the called telephone to initialize. This is followed by an interval 22 during which a modulated FSK signal representing a data message is introduced. This data message contains the Caller ID information.

The data message is typically composed of a series of 8 bit characters each preceded by a start bit and followed by stop bit. FIG. 2 illustrates a typical message format. The first character 30 identifies the type of message, such as a calling station directory number, an alpha-numeric message, special service indication etc. The second character 32 represents the number of characters that follow. The following data characters 34 represent the actual information to be transmitted, such as the calling station directory number, and the last character 36 is a checksum character, which provides error correction.

FIG. 3 is a functional block diagram of a typical prior art Caller ID receiver 40, which is connected to a telephone line L in parallel with conventional telephone receiving equipment R. Caller ID receiver 40 includes a ring detector 42, which is connected to the telephone line L and controls a normally open switch 44, which is also connected to the telephone line. At the output of switch 44, there is provided an AC coupler 46 designed to transmit FSK frequencies, but to block the lower frequency ringing signal. The AC coupler is connected to an FSK demodulator 48, the output of which is provided to a convertor 49, which provides serial data as an output.

In operation, when ring detector 42 detects the first ringing signal on telephone line L, it causes switch 44 to close. The ringing signal is, however, blocked by coupler 46. On the other hand, when signals in the FSK band begin to appear on telephone line L, they are transmitted through coupler 46 to demodulator 48. The demodulation output signals is then converted by convertor 49 to a serial data stream. Typically, the serial data is provided to a display, so that the Caller ID information may be displayed to the user.

Figure 4:
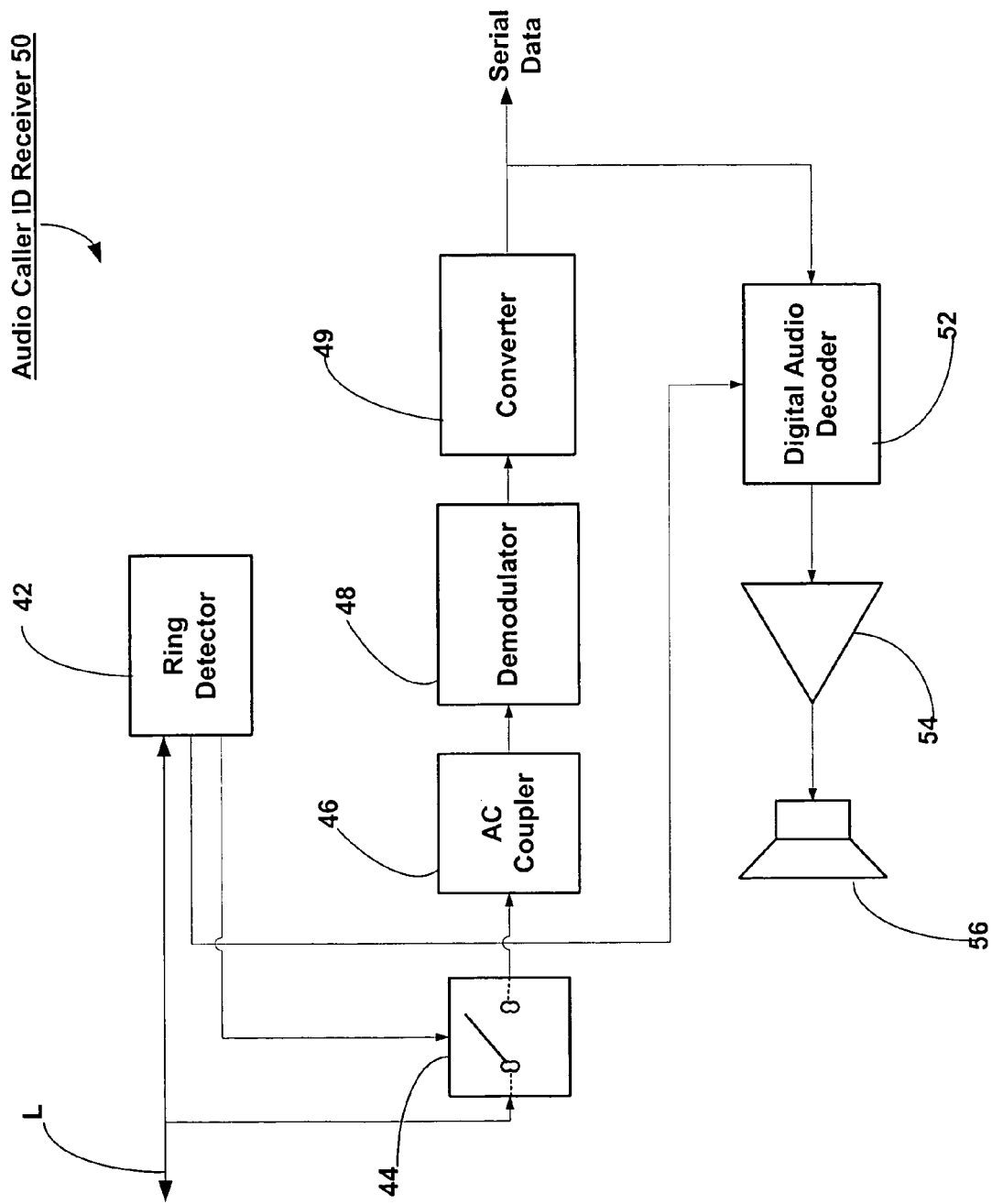
FIG. 4 is a functional block diagram illustrating a preferred embodiment of an Audio Caller ID receiver in accordance with the present invention.

FIG. 4 illustrates a preferred embodiment 50 of an Audio Caller ID receiver in accordance with the present invention. In receiver 50, components which are identical to components incorporated in receiver 40 are identified with the same reference character, operate in the same manner as in receiver 40, and will not be described further. A ring detector 42' is connected to telephone line L. This device is similar to a conventional ring detector, except that is includes a counter so that it is able to determine when the second ringing signal is received. It is assumed that receiver 50 will be providing conventional serial data in the same manner as receiver 40, so that it will be capable of operating as conventional Caller ID receiver as well. The serial data is, however, also provided to a digital audio decoder 52, which is enabled by the second signal received from ring detector 42' over lead 51. The output of digital audio decoder 52 is provided through audio amplifier 54 to a speaker 56, or the like. It should also be appreciated that the signal from amplifier 54 could be provided to the ear piece of the telephone set when receiver 50 is part of a integrated unit incorporating a telephone receiver.

In operation, ring detector 42' will enable digital audio decoder 52 when it detects the second ring signal. Thereafter, serial data provided at the output of convertor 49 will be converted by decoder 52 from digital audio to an analog audio signal which is amplified and played over speaker 56.

It should be appreciated that the serial data received by decoder 52 may be a compressed digital audio signal, in which case the decoder 52 would include the necessary components to decompress the signal prior to decoding it.

Figure 5:
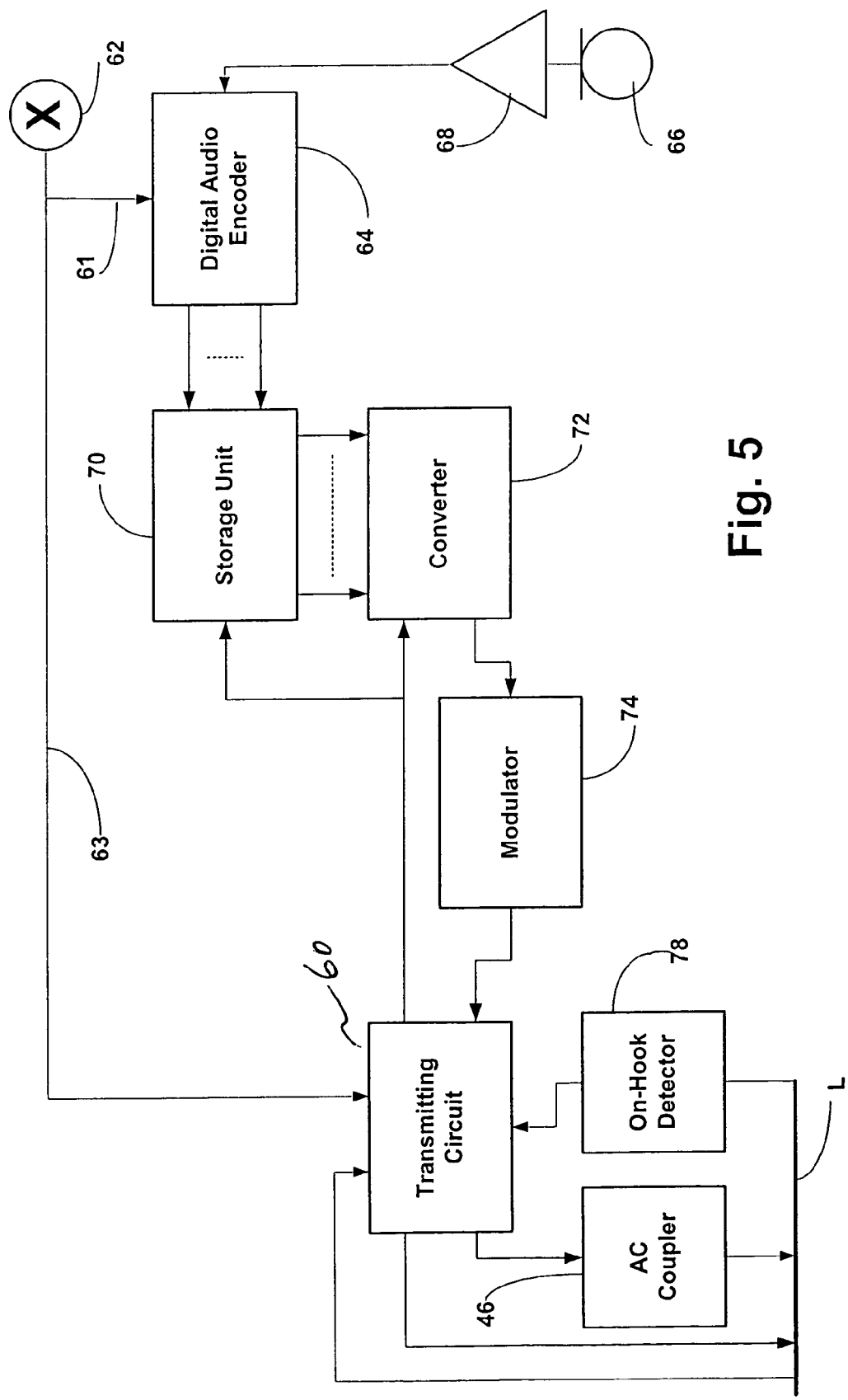
FIG. 5 is a functional block diagram illustrating a preferred embodiment of an Audio Caller ID transmitter in accordance with the present invention.

FIG. 5 is a block diagram illustrating a preferred embodiment 60 of an audio Caller ID transmitter in accordance with the present invention. Transmitter 60 includes an enabling switch, such as a push button 62 which a user presses when he wishes to store an audio message that is to be sent to a receiver. Operating switch 62 causes a predetermined triggered signal to appear on leads 61 and 63. The signal on lead 61 causes a digital audio encoder 62 to be enabled, whereby the operator may digitally encoder an audio signal provided by a microphone 66 and audio amplifier 68 to encoder 64. A digital signal from encoder 64 is stored in a storage unit 70. It should be appreciated that encoder 64 may include components for compressing the digital audio signal. Storage unit 70 is connected to a converter 72, which converts digital words stored in unit 70 to a serial data stream. The serial data stream is provided through an FSK modulator 74 to a transmitter circuit 76. The output of transmitter circuit 76 is coupled to the telephone line L, and the transmitter circuit also receives a control input from the telephone line. Also connected to telephone line L is an off-hook detector 78, which enables transmitter circuit 76.

In operation, the user preferably records an audio message prior to going off hook on his telephone transmitter. Alternatively, the user may begin recording when he hears the dial tone. He begins recording by operating the switch 62, at which point encoder 64 and transmitter circuit 76 are placed in a ready state. The user speaks into the microphone 66, whereby the audio signal is converted into a digital signal by encoder 64 and, optionally, compressed. The digital signal is stored in storage unit 70, and the user is ready to place his telephone call. Off-hook detector 78 detects when the user goes off hook and enables transmitting circuit 76. At this point, transmitting circuit 76 places a predetermined signal on the telephone line, which is recognized by the central office as indicating that a digital audio message is waiting. The central office then receives the telephone number dialed by the user in the usual manner and, when dialing is complete sends a predetermined signal over the telephone line indicating to transmitting circuit 76 that it is ready to receive the audio message. Transmitting circuit 76 detects this signal, enables convertor 72 and enables storage units 70 to output the recorded message.

Converter 72 converts the stored words from storage unit 70 into a serial data stream, which is provided to modulator 74. Modulator 74 then produces an FSK signal, which is coupled to telephone line L via AC coupler 46. This FSK signal is provided to the Audio Caller ID receiver 50 at the site of the receiving party.

The message format for Audio Caller ID messages could be similar to that of FIG. 2, except that character 30 is selected to be unique to an Audio Caller ID signal and character 32 would represents the message length in fractions of a second (e.g., ⅛ second increments).

Although preferred embodiments of the invention have been disclosed for illustrative purposes, those skilled in the art will appreciate that many additions, modifications and substitutions are possible, without departing from the scope and spirit of the invention as defined by the accompanying claims.

What is claimed is:

1. A method for communicating an audio message between a calling telephone apparatus and a called telephone apparatus while said called telephone apparatus remains in an on-hook state, said calling telephone apparatus and said called telephone apparatus being connected to a telephone system, said method comprising steps of:

receiving a telephone call at a called telephone apparatus from said calling telephone apparatus;

introducing a digitized version of said audio message relating to a call from said calling telephone apparatus over a telephone line to said called telephone apparatus while said telephone line of said called telephone apparatus remains in said on-hook state; and introducing a signal identifying said calling party during a silent interval following a first ringing signal provided to said called telephone apparatus.

2. The method of claim 1, wherein:

said called telephone apparatus is provided Caller ID information, in addition to said audio message.

3. The method of claim 1 wherein:

said digitized version of said audio message is of sufficient duration to extend beyond a silent interval in which it begins.

4. A method for communicating an audio message from a calling telephone apparatus to called telephone apparatus while said called telephone apparatus remains in an on-hook state, said calling telephone apparatus and said called telephone apparatus being connected to a telephone system, said method comprising the steps of:

receiving a digitized version of said audio message relating to a call from said calling telephone apparatus to said called telephone apparatus over a telephone line during a silent interval following a ringing signal appearing at said called telephone apparatus;

converting said digitized version of said audio message to an acoustic version thereof;

introducing said acoustic version to a speaker to produce an audible version of said audio message; and receiving a signal identifying said called party during said silent interval following a first ringing signal appearing at said called telephone apparatus.

5. The method of claim 4, wherein:

said called telephone apparatus is provided Caller ID information, in addition to said audio message.

6. The method of claim 4 wherein:

said digitized version of said audio message is of sufficient duration to extend beyond said silent interval in which it begins.

7. Apparatus for communicating an audio message between a calling telephone apparatus and a called telephone apparatus while said called telephone apparatus remains in an on-hook state, said calling telephone apparatus and said called telephone apparatus being connected to a telephone system, comprising:

a silence detector detecting a silent interval following a ringing signal provided to said called telephone apparatus;

a signal injector, responsive to said silence detector, introducing a digitized version of said audio message relating to a call from said calling telephone apparatus to said called telephone apparatus over a telephone line during said detected silent interval; and a second signal injector introducing a signal identifying said calling party during said silent interval following a first ringing signal provided to said called telephone apparatus.

8. The apparatus of claim 7, wherein:

said called telephone apparatus is provided Caller ID information, in addition to said audio message.

9. The apparatus of claim 7 wherein:

said signal injector introduces a digitized version of said audio message during an interval which begins during said silent interval and extends beyond it.

10. Apparatus for communicating an audio message from a calling telephone apparatus to a called telephone apparatus while said called telephone apparatus remains in an on-hook state, said calling telephone apparatus and said called telephone apparatus being connected to a telephone system, comprising:

a silence detector detecting a silent interval following a second ringing signal provided to said called telephone apparatus;

a receiver, responsive to said silence detector, receiving a digitized version of said audio message relating to a call from a calling telephone to said called telephone apparatus over a telephone line during said detected silent interval;

a digital-to-analog converter converting said digitized version of said audio message to an audio version thereof;

a speaker responsive to said audio version to produce an audible version of said audio message; and a second receiver responsive to said detection by said silence detector of said silent interval following a first ringing signal.

11. The apparatus of claim 10, wherein:

wherein said second receiver receives, during said silent interval following said first ringing signal, a signal identifying said calling party;

whereby said called telephone apparatus is provided Caller ID information, in addition to said audio message.

12. The apparatus of claim 10 wherein:

said receiver receives said digitized version of said audio signal during an interval which begins during said silent interval and extends beyond it.

* * * * *